United States Patent
Hwang et al.

(10) Patent No.: US 12,013,550 B2
(45) Date of Patent: Jun. 18, 2024

(54) APERTURE MODULE AND CAMERA MODULE

(71) Applicant: SAMSUNG ELECTRO-MECHANICS CO., LTD., Suwon-si (KR)

(72) Inventors: Se Yeon Hwang, Suwon-si (KR); Seok Hwan Kim, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 278 days.

(21) Appl. No.: 17/179,655

(22) Filed: Feb. 19, 2021

(65) Prior Publication Data

US 2022/0128832 A1 Apr. 28, 2022

(30) Foreign Application Priority Data

Oct. 26, 2020 (KR) .................. 10-2020-0139601

(51) Int. Cl.
*G02B 27/64* (2006.01)
*G02B 7/02* (2021.01)

(52) U.S. Cl.
CPC ........... *G02B 27/646* (2013.01); *G02B 7/021* (2013.01); *G02B 7/022* (2013.01)

(58) Field of Classification Search
CPC ...... G02B 27/646; G02B 7/021; G02B 7/022; G02B 5/005; G03B 9/06; G03B 29/00; G03B 30/00; H04N 23/55
USPC .................................................. 359/738–740
See application file for complete search history.

(56) References Cited

U.S. PATENT DOCUMENTS

| | | | | |
|---|---|---|---|---|
| 1,861,257 | A * | 5/1932 | Barenyi | G03B 9/22 396/498 |
| 3,980,407 | A * | 9/1976 | Hill | G21K 1/04 355/71 |
| 2016/0178989 | A1* | 6/2016 | Ochi | G02B 7/10 396/510 |
| 2019/0373145 | A1 | 12/2019 | Yu et al. | |
| 2020/0026149 | A1 | 1/2020 | Jun | |
| 2020/0028998 | A1 | 1/2020 | Jun | |
| 2020/0241387 | A1 | 7/2020 | Seo et al. | |
| 2020/0278590 | A1* | 9/2020 | Nakada | G02B 7/021 |
| 2020/0301246 | A1 | 9/2020 | Seo et al. | |
| 2020/0409234 | A1 | 12/2020 | Jun | |
| 2021/0109305 | A1* | 4/2021 | Hu | G02B 5/005 |

FOREIGN PATENT DOCUMENTS

| | | |
|---|---|---|
| CN | 110737146 A | 1/2020 |
| CN | 110737147 A | 1/2020 |
| CN | 209979707 U | 1/2020 |

(Continued)

OTHER PUBLICATIONS

Machine translation of WO-03028074-A1 (Year: 2003).*

(Continued)

*Primary Examiner* — Darryl J Collins
*Assistant Examiner* — Matthew Y Lee
(74) *Attorney, Agent, or Firm* — NSIP Law

(57) ABSTRACT

An aperture module includes: a base; a rotating plate rotatably disposed on the base; and blades configured to form an incident hole and move by rotation of the rotating plate to change a size of the incident hole. The blades are disposed in an opening disposed inside the rotating plate.

24 Claims, 10 Drawing Sheets

(56) References Cited

FOREIGN PATENT DOCUMENTS

| | | |
|---|---|---|
| CN | 111596500 A | 8/2020 |
| CN | 212255876 U | 12/2020 |
| JP | 2005-79555 A | 3/2005 |
| JP | 2005-338711 A | 12/2005 |
| KR | 10-2009-0050608 A | 5/2009 |
| KR | 10-2019-0138344 A | 12/2019 |
| KR | 10-2020-0093997 A | 8/2020 |
| KR | 10-2020-0112158 A | 10/2020 |
| WO | WO-03028074 A1 * | 4/2003 ............. G02B 5/005 |

OTHER PUBLICATIONS

Chinese Office Action issued on Oct. 27, 2021 in corresponding Chinese Patent Application No. 202121541862.7 (2 pages in English, 2 pages in Chinese).

Korean Office Action issued on Jan. 26, 2022 in corresponding Korean Patent Application No. 10-2020-0139601 (5 pages in English and 4 pages in Korean).

Chinese Office Action Issued on Mar. 29, 2024, in Counterpart Chinese Patent Application No. 202110766920.4 (4 Pages in English, 6 Pages in Chinese).

\* cited by examiner

APERTURE MODULE AND CAMERA MODULE

CROSS-REFERENCE TO RELATED APPLICATIONS

This application claims the benefit under 35 U.S.C. § 119(a) of Korean Patent Application No. 10-2020-0139601 filed on Oct. 26, 2020 in the Korean Intellectual Property Office, the entire disclosure of which is incorporated herein by reference for all purposes.

BACKGROUND

1. Field

The following description relates to an aperture module and a camera module including the same.

2. Description of Related Art

Recently, camera modules have been standardly installed in portable electronic devices such as tablet personal computers (PCs), notebooks, or the like, as well as smartphones. A general digital camera includes a mechanical aperture to change an amount of incident light depending on an image capturing environment, but it is difficult for a camera module used in a small product such as the portable electronic device to separately include an aperture due to structural characteristics and spatial limitations.

In the case of smartphone cameras, since a space in which the aperture may be mounted is limited, an aperture mounted in a smartphone camera module developed to date has had fixed values, corresponding to two sections of large and small sizes. Therefore, a selection range is limited, and there is a limit to acquiring the amount of light that a user desires when capturing images.

Furthermore, a number of blades are required to implement an incident hole size of the aperture to be diverse and close to a spherical shape, and accordingly, there is a problem that a thickness of the aperture module may be increased.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an aperture module includes: a base; a rotating plate rotatably disposed on the base; and blades configured to form an incident hole and move by rotation of the rotating plate to change a size of the incident hole, wherein the blades are disposed in an opening disposed inside the rotating plate.

The blades and the rotating plate may be disposed at substantially a same position in an optical axis direction.

The blades may be disposed to at least partially overlap each other in an optical axis direction.

The blades may include a first type blade and a second type blade at least partially overlapping the first type blade in an optical axis direction. The first type blade and the second type blade may be alternately arranged in a circumferential direction.

The first type blade may include two or more first type blades, and the second type blade may include two or more second type blades.

The first type blade may include a first portion and a second portion thinner than the first portion. At least a portion of the second portion may be configured to be selectively accommodated in an accommodating portion formed in the second type blade.

The aperture module may further include a link connected to at least one of the blades and the rotating plate, respectively.

The link may include includes a first hole and a second hole disposed at one end of the link and another end of the link, respectively. The rotating plate may include a first pin corresponding to the first hole. The least one of the blades may include a second pin corresponding to the second hole.

The rotating plate may include a depression portion having a height lower than a height of a periphery of the rotating plate. The first pin may be disposed in the depression portion.

The at least one of the blades includes a depression portion having a height lower than that of a periphery. The second pin may be disposed in the depression portion.

The aperture module may further include a plate fixedly disposed on the base and forming a seating surface at least partially in contact with the rotating plate and the blades.

The plate may include a protruding portion corresponding to at least one of the blades on the seating surface. At the least one of the blades may include a guide groove configured to accommodate the protruding portion.

The guide groove may extend in a radial direction of the rotating plate.

At least one of the blades may include protruding portion. The plate may include a guide groove disposed on the seating surface and configured to accommodate the protruding portion.

In another general aspect, an aperture module includes: a base; a rotating plate rotatably disposed on the base; blades configured to form an incident hole and move by rotation of the rotating plate to change a size of the incident hole; and a link connected to at least one of the blades and the rotating plate, respectively.

The link may be rotatably coupled to the at least one of the blades and the rotating plate, respectively.

The blades may include two or more first type blades and two or more second type blades at least partially overlapping the two or more first type blades, respectively, in an optical axis direction. The first type blades and the second type blades may be alternately arranged in a circumferential direction.

The blades may include a first blade and a second blade at least partially overlapping the first blade in an optical axis direction. An end portion of the second blade may include a recess configured to receive an end portion of the first blade.

In another general aspect, a camera module includes: a case; a lens module disposed in the case and including at least one lens having an optical axis; and an aperture module disposed over the lens module in a direction of the optical axis. The aperture module includes: a base; a rotating plate rotatably disposed on the base, and including a ring-shaped member surrounding an opening through which an optical axis extends; and blades configured to form a hole through which light incident to the aperture model passes, and configured to be rotated by the rotating plate to change a size of the hole. The blades are disposed in the opening without overlapping the ring-shaped member in the direction of the optical axis.

The camera module may further include: a guide plate forming a seating surface on which the blades and the rotating plate are disposed. The guide plate may be configured to guide movement of the blades in a radial direction with respect to the optical axis.

The camera module may further include rotatable links connecting the rotating plate to the blades, respectively.

The blades may include a first blade and a second blade at least partially overlapping the first blade in the direction of the optical axis. An end portion of the second blade may include a recess configured to receive an end portion of the first blade.

A surface of the first blade may include a stepped portion configured to interface with the end portion of the second blade.

In another general aspect, a portable electronic device may include the camera module described above.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
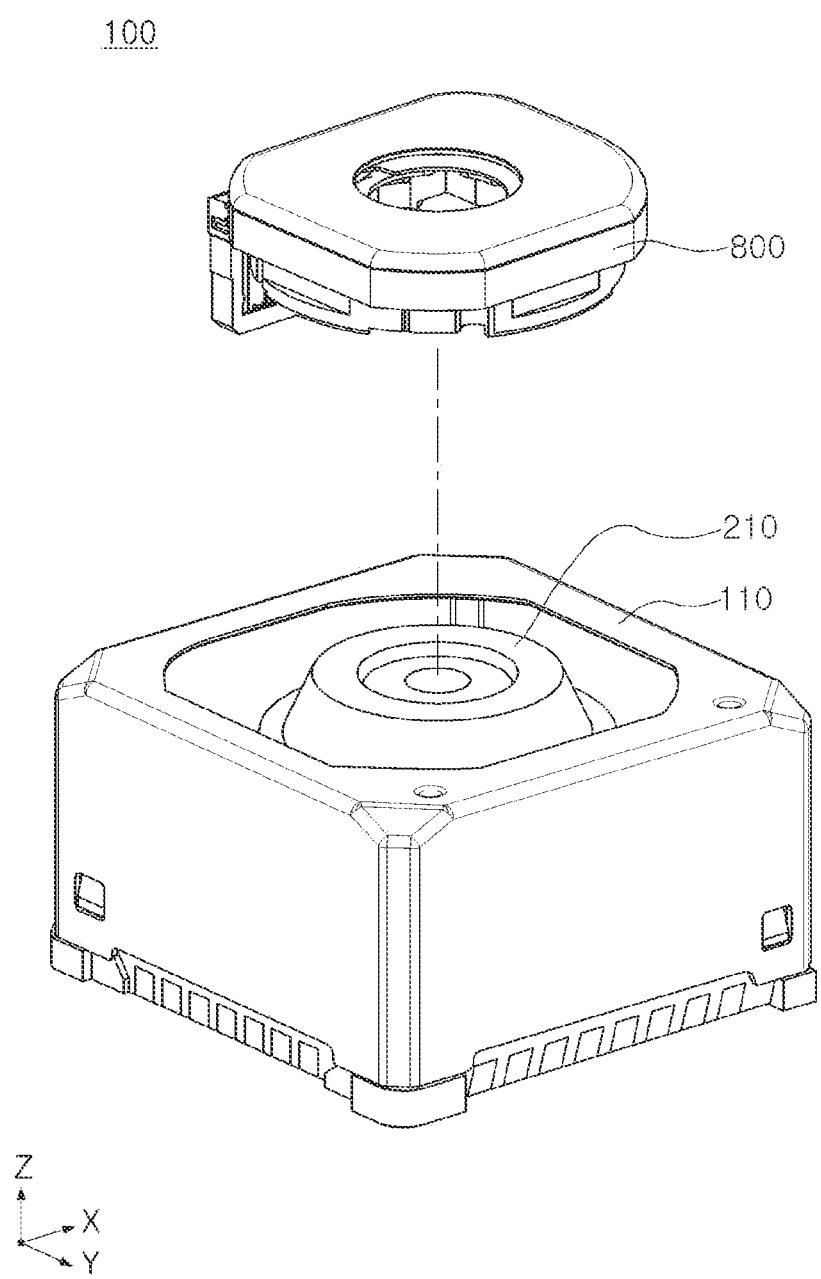
FIG. 1 is a perspective view of a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

Figure 2:
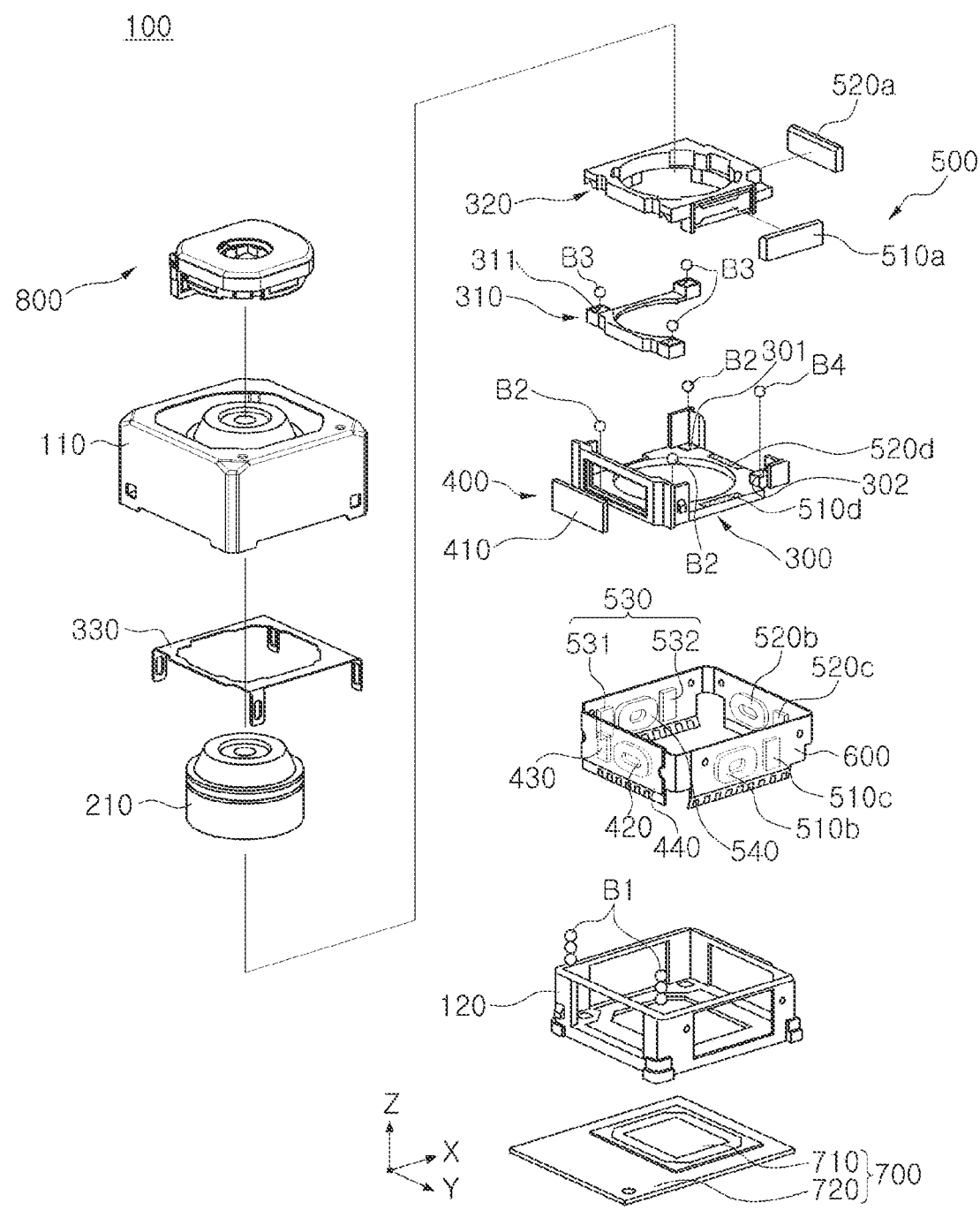
FIG. 2 is a schematic exploded perspective view of the camera module, according to an embodiment.

FIG. 1 is a perspective view of a camera module 100, according to an embodiment. FIG. 2 is a schematic exploded perspective view of the camera module 100.

Referring to FIGS. 1 and 2, the camera module 100 may include, for example, a lens barrel 210, an actuator configured to move the lens barrel 210, a case 110 and a housing 120 accommodating the lens barrel 210 and the actuator therein, an image sensor module 700 configured to convert light incident through the lens barrel 210 into an electrical signal, and an aperture module 800 configured to adjust an amount of light incident to the lens barrel 210.

The lens barrel 210 may have a hollow cylindrical shape so that a plurality of lenses configured to capture an image of a subject may be accommodated therein, and the plurality of lenses may be mounted in the lens barrel 210 along an optical axis. The number of lenses disposed in the lens barrel 210 may depend on a design of the lens barrel 210, and the respective lenses may have optical characteristics such as the same refractive index, different refractive indices, and the like.

The actuator may move the lens barrel 210. As an example, the actuator may move the lens barrel 210 in an optical axis (Z-axis) direction to focus the lenses, and move the lens barrel 210 in a direction perpendicular to the optical axis (the Z-axis) to correct shake at the time of capturing an image. The actuator may include a focusing portion 400 configured to focus the lenses and a shake correction portion 500 configured to correct the shake.

The image sensor module 700 may convert light incident thereto through the lens barrel 210 into an electrical signal. As an example, the image sensor module 700 may include an image sensor 710 and a printed circuit board 720 connected to the image sensor 710, and may further include an infrared filter. The infrared filter may cut off light in an infrared region in the light incident thereto through the lens barrel 210. The image sensor 710 may convert the light incident thereto through the lens barrel 210 into an electrical signal. As an example, the image sensor 710 may include a charge coupled device (CCD) or a complementary metal oxide semiconductor (CMOS). The electrical signal converted by the image sensor 710 may be output as an image through a display unit of a portable electronic device, for example. The image sensor 710 may be fixed to the printed circuit board 720, and may be electrically connected to the printed circuit board 720 by wire bonding.

The lens barrel 210 and the actuator may be accommodated in the housing 120. As an example, the housing 120 may have a shape of which the top and the bottom of the housing 120 are open, and the lens barrel 210 and the actuator may be accommodated in an internal space of the housing 120. The image sensor module 700 may be disposed on the bottom of the housing 120.

The case 110 may be coupled to the housing 120 to surround outer surfaces of the housing 120, and may protect internal components of the camera module 100. In addition, the case 110 may shield electromagnetic waves. The case 110 may be formed of a metal and, thus, may be grounded to a ground pad disposed on the printed circuit board 720, resulting in shielding the electromagnetic waves.

The actuator may move the lens barrel 210 in order to focus the lenses on the subject. As an example, the actuator may include the focusing portion 400 configured to move the lens barrel 210 in the optical axis (Z-axis) direction.

The focusing portion 400 may include a magnet 410 and an integrated coil 420 configured to generate driving force to move the lens barrel 210 and a carrier 300 accommodating the lens barrel 210 therein in the optical axis (Z-axis) direction.

The magnet 410 may be mounted on the carrier 300. As an example, the magnet 410 may be mounted on a first surface of the carrier 300. The coil 420 may be mounted on the housing 120, and may be disposed to face the magnet 410. As an example, the coil 420 may be disposed on a first surface of a substrate 600, and the substrate 600 may be mounted on the housing 120.

The magnet 410 may be mounted on the carrier 300 to thus move in the optical axis (Z-axis) direction together with the carrier 300, and the coil 420 may be fixed to the housing 120. However, according to another embodiment, positions of the magnet 410 and the coil 420 may be exchanged with each other.

When a driving signal is applied to the coil 420, the carrier 300 may be moved in the optical axis (Z-axis) direction by electromagnetic interaction between the magnet 410 and the coil 420.

Since the lens barrel 210 is accommodated in the carrier 300, the lens barrel 210 may also be moved in the optical axis (Z-axis) direction by the movement of the carrier 300. In addition, since a frame 310 and a lens holder 320 are accommodated in the carrier 300, the frame 310, the lens holder 320, and the lens barrel 210 may be moved together in the optical axis (Z-axis) direction by the movement of the carrier 300.

Rolling members B1 may be disposed between the carrier 300 and the housing 120 to reduce friction between the carrier 300 and the housing 120 when the carrier 300 is moved. The rolling members B1 may have a ball form. The rolling members B1 may be disposed on opposite sides of the magnet 410.

A yoke 440 may be disposed on the housing 120. As an example, the yoke 440 may be mounted on the substrate 600 and disposed on the housing 120. The yoke 440 may be provided on the second surface of the substrate 600. Therefore, the yoke 440 may be disposed to face the magnet 410 with the coil 420 interposed therebetween. Attractive force may act in a direction perpendicular to the optical axis (Z-axis) between the yoke 440 and the magnet 410. Therefore, the rolling members B1 may be maintained in a state of contact with the carrier 300 and the housing 120 by attractive force between the yoke 440 and the magnet 410. In addition, the yoke 440 may collect magnetic force of the magnet 410 to prevent generation of a leaked magnetic flux. As an example, the yoke 440 and the magnet 410 may form a magnetic circuit.

In the disclosure herein, in a focusing process, a closed loop control manner of sensing and feedbacking a position of the lens barrel 210 may be used. Therefore, the focusing portion may include a position detection element for closed loop control. As an example, the position detection element may include an AF hall element 430. A magnetic flux value detected by the AF hall element 430 may change according to the movement of the magnet 410 facing the AF hall element 430. The position detection element may detect the position of the lens barrel 210 from a change in the magnetic flux value of the AF hall element 430 according to the movement of the magnet 410 in the optical axis (Z axis) direction.

The shake correction portion 500 may be operated to correct image blurring or moving picture shaking due to a factor such as handshake of a user at the time of capturing an image or a moving picture. For example, when the shake is generated at the time of capturing the image due to the handshake of the user or the like, the shake correction portion 500 may apply a relative displacement corresponding to the shake to the lens barrel 210 to compensate for the shake. As an example, the shake correction portion 500 may move the lens barrel 210 in the direction perpendicular to the optical axis (the Z-axis) to correct the shake.

The shake correction portion 500 may include first and second magnets 510a and 520a, and first and second coils 510b and 520b configured to generate driving force to move a guide member in the direction perpendicular to the optical axis (the Z-axis). The frame 310 and the lens holder 320 may be inserted into the carrier 300, may be stacked in the optical axis (the Z axis) direction, and may guide the movement of the lens barrel 210. The frame 310 and the lens holder 320 may have a space into which the lens barrel 210 may be inserted. The lens barrel 210 may be inserted and fixed into the lens holder 320.

The frame 310 and the lens holder 320 may be moved in the direction perpendicular to the optical axis (the Z-axis) with respect to the carrier 300 by the driving force generated according to the electromagnetic interaction between the first and second magnets 510a and 520a, and the first and second coils 510b and 520b, respectively. The first magnet 510a is disposed on a second surface of the lens holder 320 and the first coil 510b is disposed on the second surface of the substrate 600, so that the first magnet 510a and the first coil 510b may generate driving force in a first axis (Y axis) direction perpendicular to the optical axis (the Z axis). In addition, a second magnet 520a is disposed on a third surface of the lens holder 320 and a second coil 520b is disposed on a third surface of the substrate 600, so that the second magnet 520a and the second coil 520b may generate driving force in a second axis (X axis) direction perpendicular to the first axis (the Y axis). Here, the second axis (the X axis) refers to an axis perpendicular to both of the optical axis (the Z axis) and the first axis (the Y axis). The first and second magnets 510a and 520a may be disposed to be orthogonal to each other on a plane perpendicular to the optical axis (the Z axis).

The first and second magnets 510a and 520a may be mounted on the lens holder 320, and the first and second coils 510b and 520b, which face the first and second magnets 510a and 520a, respectively, may be disposed on the substrate 600 and be mounted on the housing 120.

The first and second magnets 510a and 520a may be moved in the direction perpendicular to the optical axis (the Z axis) together with the lens holder 320, and the first and second coils 510b and 520b may be fixed to the housing 120. However, according to another embodiment, positions of the first and second magnets 510a and 520a, and the first and second coils 510b and 520b may be exchanged with each other.

In this disclosure, in a shake correction process, a closed loop control manner of sensing and feedbacking a position of the lens barrel 210 may be used. Therefore, the shake correction portion 500 may include a position detection element for closed loop control. The position detection element may include first and second optical image stabilization (OIS) hall elements 510c and 520c. The first and second OIS hall elements 510c and 520c may be disposed on the substrate 600 and be mounted on the housing 120. Therefore, the first and second OIS hall elements 510c and 520c may face the first and second magnets 510a and 520a, respectively, in the direction perpendicular to the optical axis (Z axis). As an example, the first OIS hall element 510c may be disposed on the second surface of the substrate 600, and the second OIS hall element 520c may be disposed on the third surface of the substrate 600.

Magnetic flux values of the first and second OIS hall elements 510c and 520c may change according to the movement of the first and second magnets 510a and 520a, respectively. The position detection element may detect the position of the lens barrel 210 from a change in the magnetic flux values of the first and second OIS hall elements 510c and 520c according to the movement of the first and second magnets 510a and 520a, respectively, in two directions (X axis direction and Y axis direction) perpendicular to the optical axis.

The camera module 100 may include a plurality of ball members supporting the shake correction portion 500. The plurality of ball members may serve to guide movements of the frame 310, the lens holder 320, and the lens barrel 210 in the shake correction process. In addition, the plurality of ball members may also serve to maintain an interval between the carrier 300, the frame 310, and the lens holder 320.

The plurality of ball members may include first ball members B2 and second ball members B3. The first ball members B2 may guide movement of the frame 310, the lens holder 320, and the lens barrel 210 in the first axis (Y axis) direction, and the second ball members B3 may guide movement of the lens holder 320 and the lens barrel 210 in the second axis (X axis) direction.

As an example, the first ball members B2 may be moved in a rolling motion in the first axis (Y axis) direction when driving force in the first axis (Y axis) direction is generated. Therefore, the first ball members B2 may guide the movements of the frame 310, the lens holder 320, and the lens barrel 210 in the first axis (X axis) direction. In addition, the second ball members B3 may be moved in a rolling motion in the second axis (X axis) direction when driving force in the second axis (X axis) direction is generated. Therefore, the second ball members B3 may guide the movements of the lens holder 320 and the lens barrel 210 in the second axis (X axis) direction.

The first ball members B2 may include a plurality of ball members disposed between the carrier 300 and the frame 310, and the second ball members B3 may include a plurality of ball members disposed between the frame 310 and the lens holder 320.

First guide groove portions 301 accommodating the first ball members B2 therein may be formed, respectively, in surfaces of the carrier 300 and the frame 310 facing each other in the optical axis (Z axis) direction. The first guide groove portions 301 may include a plurality of guide grooves corresponding to the plurality of ball members of the first ball members B2. The first ball members B2 may be accommodated in the first guide groove portions 301 and be fitted between the carrier 300 and the frame 310. In a state in which the first ball members B2 are accommodated in the first guide groove portions 301, a movement of the first ball members B2 in the optical axis (Z axis) direction and the second axis (X axis) direction may be restricted, and the first ball members B2 may be moved in only the first axis (Y axis) direction. As an example, the first ball members B2 may be moved in a rolling motion in only the first axis (Y axis) direction. To this end, a planar shape of each of the plurality of guide grooves of the first guide groove portions 301 may be a rectangular shape having a length in the first axis (Y axis) direction.

Second guide groove portions 311 accommodating the second ball members B3 therein may be formed, respectively, in surfaces of the frame 310 and the lens holder 320 facing each other in the optical axis (Z axis) direction. The second guide groove portions 311 may include a plurality of guide grooves corresponding to the plurality of ball members of the second ball members B3.

The second ball members B3 may be accommodated in the second guide groove portions 311 and fitted between the frame 310 and the lens holder 320. In a state in which the second ball members B3 are accommodated in the second guide groove portions 311, a movement of the second ball members B3 in the optical axis (Z axis) direction and the first axis (Y axis) direction may be restricted, and the second ball members B3 may only be moved in the second axis (X axis) direction. As an example, the second ball members B3 may be moved in a rolling motion in only the second axis (X axis) direction. To this end, a planar shape of each of the plurality of guide grooves of the second guide groove portions 311 may be a rectangular shape having a length in the second axis (X axis) direction.

Third ball members B4 supporting the movement of the lens holder 320 may be provided between the carrier 300 and the lens holder 320. The third ball members B4 may guide both of movement of the lens holder 320 in the first axis (Y axis) direction and movement of the lens holder 320 in the second axis (X axis) direction.

As an example, the third ball members B4 may be moved in a rolling motion in the first axis (Y axis) direction when driving force in the first axis (Y axis) direction is generated. Therefore, the third ball members B4 may guide the movement of the lens holder 320 in the first axis (Y axis) direction.

In addition, the third ball members B4 may be moved in a rolling motion in the second axis (X axis) direction when driving force in the second axis (X axis) direction is generated. Therefore, the third ball members B4 may guide the movement of the lens holder 320 in the second axis (X axis) direction. Meanwhile, the second ball members B3 and the third ball members B4 may be in contact with and support the lens holder 320.

Third guide groove portions 302 accommodating the third ball members B4 therein may be formed, respectively, in surfaces of the carrier 300 and the lens holder 320 facing each other in the optical axis (Z axis) direction. The third ball members B4 may be accommodated in the third guide groove portions 302 and be fitted between the carrier 300 and the lens holder 320. In a state in which the third ball members B4 are accommodated in the third guide groove portions 302, a movement of the third ball members B4 in the optical axis (Z axis) direction may be restricted, and the third ball members B4 may be moved in a rolling motion in the first axis (Y axis) direction and the second axis (X axis) direction. To this end, a planar shape of each of the third guide groove portions 302 may be a circular shape. Therefore, the third guide groove portions 302 may have a planar shape different from those of the first and second guide groove portions 301 and 311.

The first ball members B2 may be movable in the rolling motion in the first axis (Y axis) direction, the second ball members B3 may be movable in the rolling motion in the second axis (X axis) direction, and the third ball members B4 may be movable in the rolling motion in the first axis (Y axis) direction and the second axis (X axis) direction.

When the driving force in the first axis (Y axis) direction is generated, the frame 310, the lens holder 320, and the lens barrel 210 may be moved together in the first axis (Y axis) direction. Here, the first ball members B2 and the third ball members B4 may be moved in the rolling motion along the first axis (the Y axis). In this case, the movement of the second ball members B3 may be restricted.

In addition, when the driving force is generated in the second axis (X axis) direction, the lens holder 320 and the lens barrel 210 may be moved in the second axis (X axis) direction. The second ball members B3 and the third ball members B4 may be moved in the rolling motion along the second axis (the X axis). In this case, the movement of the first ball members B2 may be restricted.

A plurality of yokes 510*d* and 520*d* may be provided so that the shake correction portion 500 and the first to third ball members B2, B3, and B4 are maintained in a state in which they are in contact with each other. The plurality of yokes 510*d* and 520*d* may be fixed to the carrier 300, and may be disposed to face the first and second magnets 510*a* and 520*a*, respectively, in the optical axis (Z axis) direction. Therefore, attractive force may be generated in the optical axis (Z axis) direction between the plurality of yokes 510*d* and 520*d* and the first and second magnets 510*a* and 520*a*, respectively. Since the shake correction portion 500 is pressed toward the plurality of yokes 510*d* and 520*d* by the attractive force between the plurality of yokes 510*d* and 520*d* and the first and second magnets 510*a* and 520*a*, respectively, the frame 310 and the lens holder 320 of the shake correction portion 500 may be maintained in a state in which they are in contact with the first to third ball members B2, B3, and B4. The plurality of yokes 510*d* and 520*d* may be formed of a material that may generate the attractive force between the plurality of yokes 510*d* and 520*d* and the first and second magnets 510*a* and 520*a*, respectively. As an example, the plurality of yokes 510*d* and 520*d* may be formed of a magnetic material.

The plurality of yokes 510*d* and 520*d* may be provided so that the frame 310 and the lens holder 320 may be maintained in the state in which they are in contact with the first to third ball members B2, B3, and B4, and a stopper 330 may be provided to prevent the first to third ball members B2, B3, and B4, the frame 310, and the lens holder 320 from being externally separated from the carrier 300 due to external impact, or the like. The stopper 330 may be coupled to the carrier 300 to cover at least a portion of an upper surface of the lens holder 320.

The camera module 100 may include an aperture module 800. The aperture module 800 may be coupled to the lens barrel 210 through an upper portion of the case 110. As an example, the aperture module 800 may be mounted on the lens holder 320, into which the lens barrel 210 is fixedly inserted, and may be coupled to the lens barrel 210. Therefore, the aperture module 800 may move together with the lens barrel 210 and the lens holder 320.

Figure 3:
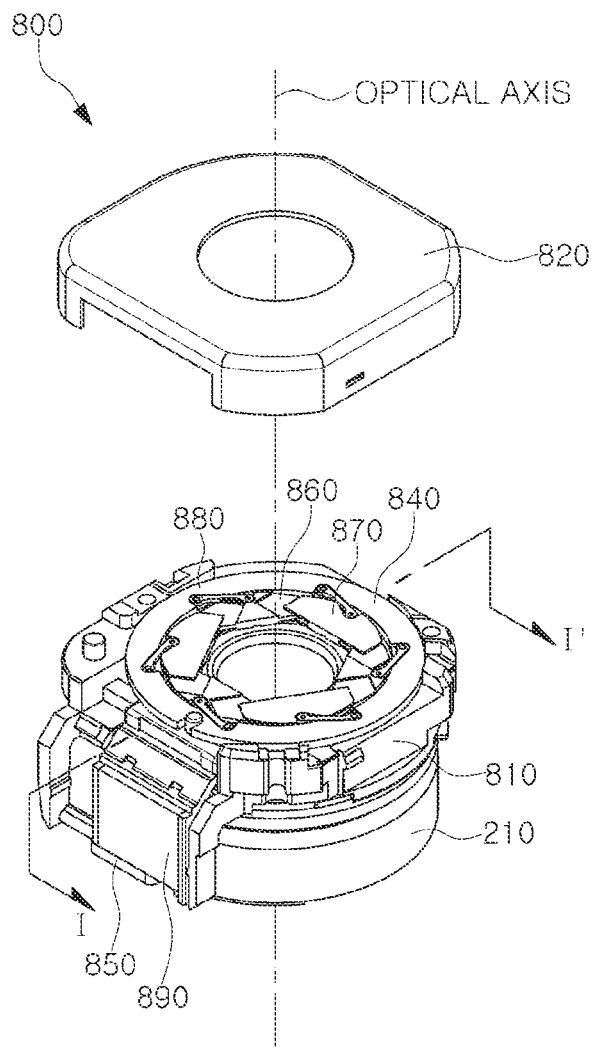
FIG. 3 is a combined perspective view in which only a cover of an aperture module shown in FIG. 2 is disassembled, according to an embodiment.

According to an embodiment, the aperture module 800 may include a magnet 890 (FIG. 3). The magnet 890 is a part of a driving portion capable of adjusting an incident hole of the aperture module 800. The magnet 890 may include two magnetic materials having different polarities.

According to an exemplary embodiment, the aperture driving portion may include a coil 540 configured to electromagnetically interact with the magnet 890. The coil 540 may be disposed on a fourth surface of the substrate 600 to face the magnet 890. Since the coil 540 is disposed on the fourth surface of the substrate 600, the magnet 890 and the coil 540 may generate a driving force in the first axis (Y axis) direction.

A hall element 530 may be fixedly disposed to face the magnet 890 on the fourth surface of the substrate 600. The hall element 530 may include a first hall element 531 and a second hall element 532 disposed with the coil 540 interposed therebetween. A magnetic flux value of the hall element 530 may change according to movement of the magnet 890. A position of the magnet 890 may be detected from the magnetic flux value of the hall element 530.

Figure 4:
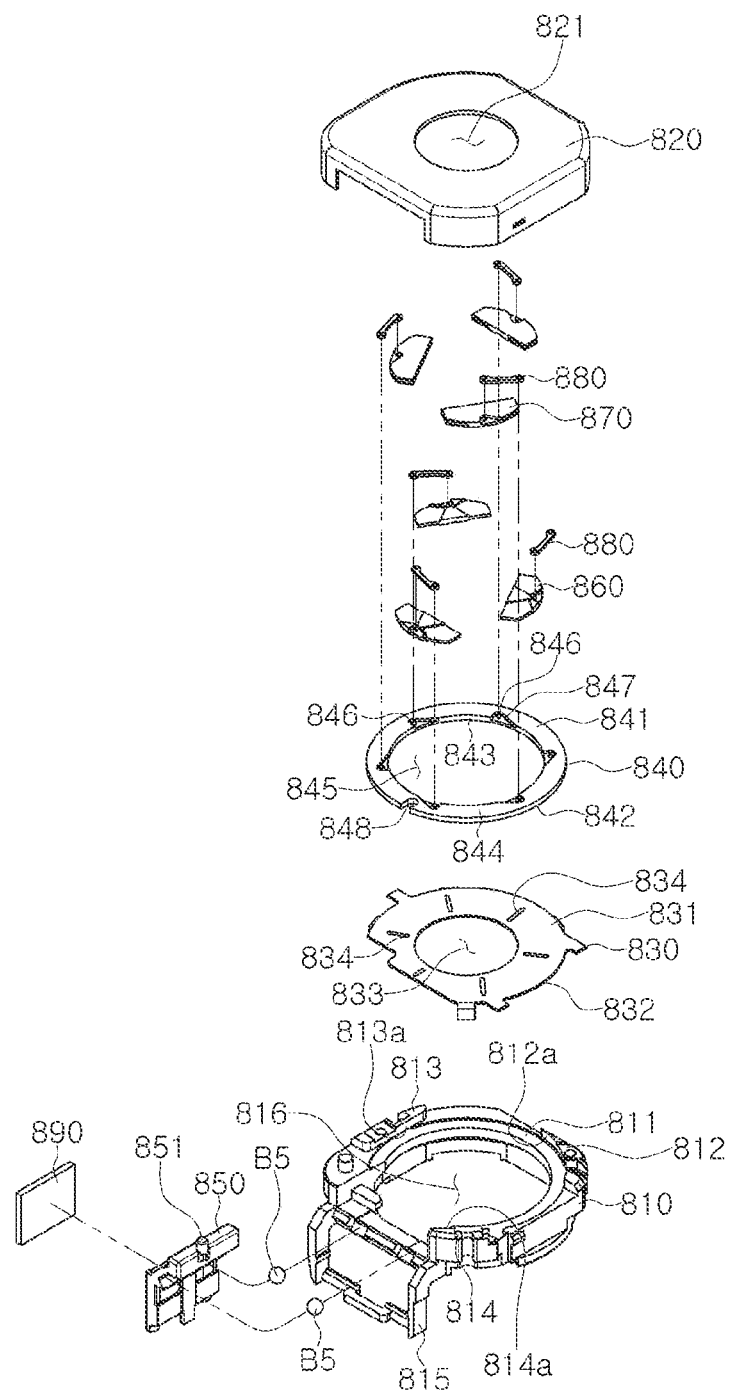
FIG. 4 is an exploded perspective view of the aperture module, according to an embodiment.
Figure 5:
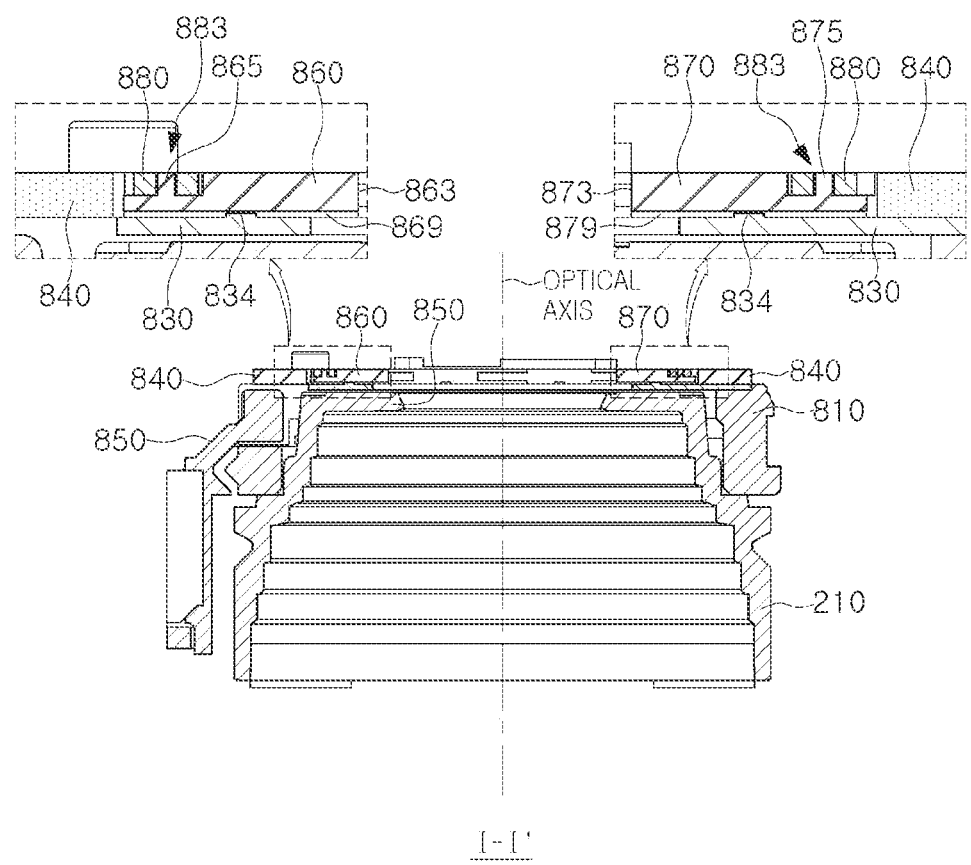
FIG. 5 is a cross-sectional view taken along line I-I' of FIG. 3.

FIG. 3 is a combined perspective view in which only a cover 820 of the aperture module 800 is disassembled, according to an embodiment. FIG. 4 is an exploded perspective view of the aperture module 800, according to an embodiment. FIG. 5 is a cross-sectional view taken along line I-I' of FIG. 3.

Referring to FIGS. 3 and 4, the aperture module 800 may include a base 810, a rotating plate 840, and blades 860 and 870.

In an embodiment, the rotating plate 840 may be rotatably disposed on the base 810. In an embodiment, the rotating plate 840 may rotate with respect to the base 810 in a plane perpendicular to the optical axis. In an embodiment, the rotating plate 840 may have a ring shape in which a center of the rotating plate 840 coincides with the optical axis.

In an embodiment, the base 810 may include extension portions 812, 813, and 814 guiding the rotation of the rotating plate 840. The base 810 may include extension portions 812, 813, and 814 extending in the optical axis direction to be in contact with an outer circumferential surface of the rotating plate 840. The extension portion 812, 813, and 814 may guide the rotation of the rotating plate 840. For example, the base 810 may have three extension portions 812, 813, and 814 on one surface thereof, and one side surfaces 812a, 813a, and 814a of the extension portions 812, 813, and 814 may be in contact with the outer circumferential surface 844 of the rotating plate 840. A clearance may exist between the extension portions 812, 813, and 814 and the outer circumferential surface 844 of the rotating plate 840 so that the rotating plate 840 may rotate smoothly. When force is applied to the rotating plate 840 by a moving portion 850 to be described in more detail later, the extension portions 812, 813, and 814 may limit a movement direction of the rotating plate 840 so that a rotational center of the rotating plate 840 deviates from the optical axis.

In an embodiment, the rotating plate 840 may include an opening 845. Blades 860 and 870 to be described later may be disposed inside the opening 845 of the rotating plate 840.

In an embodiment, the aperture module 800 may include the aperture driving portion capable of rotating the rotating plate 840. In an embodiment, the aperture driving portion may include the moving portion 850, which is attached to the base 810, the magnet 890, and the coil 540.

In an embodiment, the moving portion 850 may be slidable in one direction with respect to the base 810. In an embodiment, the base 810 may include a guide 815 to which the moving portion 850 may be mounted. The moving portion 850 may slide on the guide 815.

In an embodiment, ball members B5 may be disposed between the moving portion 850 and the guide 815 in order to reduce a frictional force between the moving portion 850 and the guide 815. The moving portion 850 and/or the guide 815 may include a guide groove partially accommodating the ball members B5, and a movement direction of the ball members B5 may be restricted to a direction in which the guide groove extends. For example, the moving portion 850 and/or the guide 815 may include a guide groove extending parallel to a slide direction of the moving portion 850.

In an embodiment, the moving portion 850 may be driven by an electromagnetic force. In an embodiment, the magnet 890 may be attached to the moving portion 850. The magnet 890 may receive an electromagnetic force by interaction with the coil 540. According to the electromagnetic interaction between the magnet 890 and the coil 540, the moving portion 850 may reciprocatively slide with respect to the base 810.

In an embodiment, the rotating plate 840 may interact with the moving portion 850. In an exemplary embodiment, a portion of the moving portion 850 may push the rotating plate 840 in a circumferential direction according to the movement of the moving portion 850, which may rotate the rotating plate 840. In an embodiment, the moving portion 850 may include a protruding portion 851 extending to the rotating plate 840. The rotating plate 840 may include an accommodating portion 848 configured to accommodate the protruding portion 851. When the moving portion 850 slides in a state in which the protruding portion 851 is accommodated in the accommodating portion 848, the protruding portion 851 may rotate the rotating plate 840 while pushing a point of the rotating plate 840. For example, the moving portion 850 may include a pin extending toward the rotating plate 840, and the rotating plate 840 may have a recess configured to accommodate the pin.

In an embodiment, the aperture module 800 may include blades 860 and 870. The blades 860 and 870 may define an incident hole of the aperture. For example, the blades 860 and 870 may be arranged in a circumferential direction, and surfaces facing the centers of the blades 860 and 870 may define the incident hole of the aperture.

In an embodiment, the aperture module 800 may include blades 860 and 870 having different shapes. In an embodiment, the aperture module 800 may include a first type blade 860 and a second type blade 870. In an embodiment, the first type blades 860 and the second type blades 870 may be arranged in alternating order in the circumferential direction.

In an embodiment, two or more first type blades 860 and two or more second type blades 870 may be provided. According to the embodiment illustrated in FIG. 3, three first type blades 860 and three second type blades 870 may be arranged in alternating order in the circumferential direction.

In an embodiment, the first type blades 860 and the second type blades 870 may be arranged at equal intervals in the circumferential direction with respect to the optical axis. In the illustrated embodiment, six total blades 860 and 870 may be arranged at equal intervals in the circumferential direction with respect to the optical axis, and the incident hole may have a hexagonal shape. In an embodiment, the first type blades 860 and the second type blades 870 may be arranged so that the distances between the blades 860 and 870 and the optical axis are all the same or substantially the same. In another embodiment, when the aperture module 800 includes two first type blades 860 and two second type blades 870, the shape of the incident hole may be a tetragonal shape. In another embodiment, when the aperture module 800 includes four first type blades 860 and four second type blades 870, the shape of the incident hole may be an octagonal shape.

In an embodiment, the first type blades 860 and the second type blades 870 may be disposed to at least partially overlap each other in the optical axis direction. The first type blades 860 may at least partially overlap adjacent second type blades 870.

In an embodiment, the first type blades 860 and the second type blades 870 may be disposed in the opening 845 of the rotating plate 840. Since the first type blades 860 and the second type blades 870 are provided in the opening 845 of the rotating plate 840, the first type blades 860 and the second type blades 870 may not overlap the rotating plate 840. In an embodiment, when the aperture module 800 is viewed in the optical axis direction, the first type and second type blades 860 and 870 and the rotating plate 840 may be disposed in regions separated from each other. For example, when the aperture module 800 is viewed in the optical axis direction, the first type and second type blades 860 and 870 may only be positioned inside the opening 845 of the rotating plate 840, and may not invade the region outside the opening 845. Since the first type and second type blades 860 and 870 are disposed so as not to overlap the rotating plate 840, the aperture module 800 may be implemented to have a thin thickness.

In an embodiment, the first type and second type blades 860 and 870 may be disposed on the same surface as the rotating plate 840 in the optical axis direction. For example, an upper surface 841 of the rotating plate 840 and upper surfaces of the first type and second type blades 860 and 870 (e.g., 861 in FIG. 6 and 871 in FIG. 7) may coincide or substantially coincide.

In an embodiment, at least one of the first type and second type blades 860 and 870 may interact with the rotating plate 840 through a link 880. In an embodiment, at least one of the first type and second type blades 860 and 870 may be connected to the rotating plate 840 through the link 880. One end of the link 880 may be connected to the at least one of the first type and second type blades 860 and 870, and the other end of the link 880 may be connected to the rotating plate 840.

Figure 6:
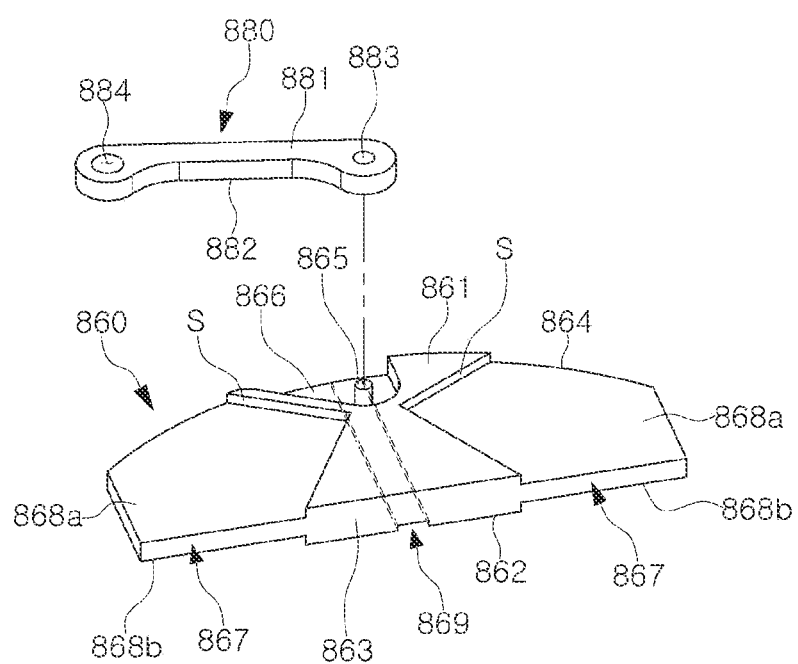
FIG. 6 illustrates a blade included in the aperture module, according to an embodiment.
Figure 7:
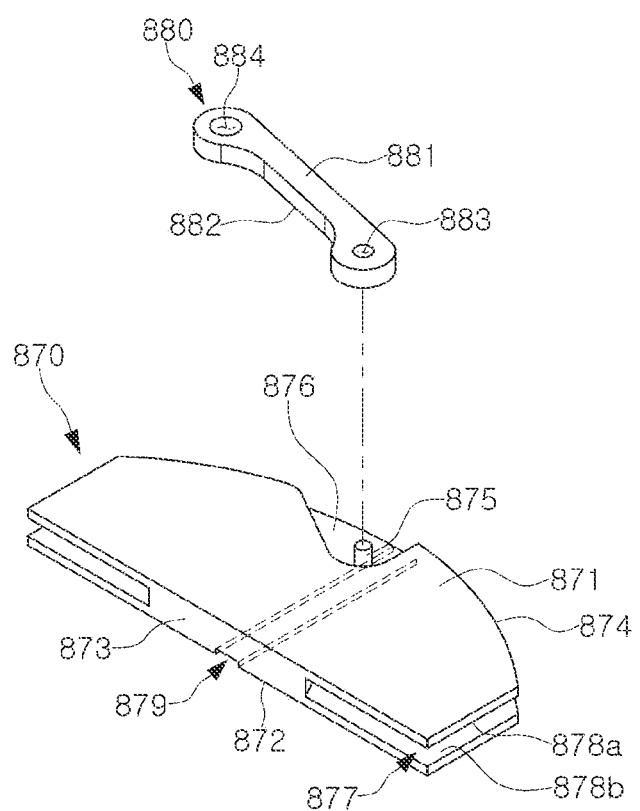
FIG. 7 illustrates another blade included in the aperture module, according to an exemplary embodiment.

Referring to FIGS. 6 and 7, in an embodiment, the link 880 may be rotatably coupled to at least one of the first type and second type blades 860 and 870 and the rotating plate 840, respectively. In an embodiment, the link 880 may include a first hole 884 at the one end thereof and a second hole 883 at the other end thereof. The rotating plate 840 may include a first pin 846 corresponding to the first hole 884, and at least one of the first type and second type blades 860 and 870 may include second pin 865 and 875, respectively, corresponding to the second hole 883. The first hole 884 and the second hole 883 may be attached to the first pin 846 and the second pins 865 and 875, respectively.

Referring to FIG. 4, in an embodiment, the first pin 846 may be disposed in a depression portion 847 having a height lower than the upper surface 841 of the rotating plate 840.

In an embodiment, a size of the incident hole may be adjusted by interaction of the first type and second type blades 860 and 870. The first type and second type blades 860 and 870, which are arranged in the circumferential direction, interact together to become closer to or farther away from the optical axis, and accordingly, the size of the incident hole may be reduced or increased.

In an embodiment, the first type and second type blades 860 and 870 may interact with the rotating plate 840. As the first type and second type blades 860 and 870 move according to the rotation of the rotating plate 840, the size of the incident hole may be adjusted.

In an embodiment, the first type and second type blades 860 and 870 may move in a direction away from or toward the optical axis. In an embodiment, the first type and second type blades 860 and 870 may move radially about the optical axis. When the blades 860 and 870 interact with the rotating plate 840, the first type and second type blades 860 and 870 may simultaneously approach the optical axis or move away from the optical axis. Accordingly, the size of the incident hole defined by the first type and second type blades 860 and 870 may be adjusted.

In an embodiment, the aperture module 800 may include a structure guiding the first type and second type blades 860 and 870 to move in a certain path according to the rotation of the rotating plate 840. In an embodiment, the aperture module 800 may further include a guide plate 830 disposed under the first type and second type blades 860 and 870. Referring to FIG. 5, the guide plate 830 may be disposed on the base 810, and the blades 860 and 870 may be disposed on the guide plate 830.

In an embodiment, the guide plate 830 may be fixedly attached to the base 810. In an embodiment, the base 810 may include a seating surface 811 for the guide plate 830, and a lower surface 832 of the guide plate 830 may be disposed on the seating surface 811 of the base 810.

In an embodiment, the base 810 may include an opening 816 for light passing through the incident hole by the first type and second type blades 860 and 870. In an embodiment, the guide plate 830 may have a ring shape.

In an embodiment, the first type and second type blades 860 and 870 and the rotating plate 840 may be disposed on regions of the guide plate 830 separated from each other and may not overlap each other. In an embodiment, an inner diameter of the guide plate 830 may be smaller than the inner diameter of the rotating plate 840. In an embodiment, the upper surface of the guide plate 830 may be divided into two regions based on the inner diameter of the rotating plate 840. The rotating plate 840 may be seated on a portion of the guide plate 830 that is larger than the inner diameter of the rotating plate 840. The first type and second type blades 860 and 870 may be seated on a portion of the guide plate 830 that is smaller than the inner diameter of the rotating plate 840.

Referring to FIGS. 4 and 5, the guide plate 830 may include a protruding portion 834 extending toward the first type and second type blades 860 and 870. The first type and second type blades 860 and 870 may be seated on the upper surface of the guide plate 830, and the protruding portion 834 corresponding to the at least one of the first type and second type blades 860 and 870 may be disposed on the upper surface of the guide plate 830.

Referring to FIGS. 6 and 7, at least one of the first type and second type blades 860 and 870 may include guide grooves 869 and 879, respectively, configured to accommodate at least a portion of the protruding portion 834. Since the protruding portion 834 has a fixed position with respect to the base 810, the movement direction of the first type and second type blades 860 and 870 with respect to the base 810 may be restricted to a direction in which the guide grooves 869 and 879 extend.

In an embodiment, the first type and second type blades 860 and 870 may move linearly with respect to the guide plate 830. In an embodiment, the shape of the guide grooves 869 and 879 and the protruding portion 834 may be formed so that the blades 860 and 870 may move linearly with respect to the guide plate 830.

In an embodiment, the guide grooves 869 and 879 may linearly extend, and the protruding portion 834 may extend in a direction parallel to the direction in which the guide grooves 869 and 879 extend. For example, the protruding portion 834 may have a shape of a square column extending in a direction parallel to the direction in which the guide grooves 869 and 879 extend, or may have a shape of an elliptical cylinder having a long axis parallel to the direction in which the guide grooves 869 and 879 extend. In another embodiment, the guide grooves 869 and 879 may linearly extend, and the protruding portion 834 may include two or more protrusions aligned in the direction in which the guide grooves 869 and 879 extend.

In an embodiment, the guide grooves 869 and 879 may extend radially from the optical axis. In an embodiment, the guide grooves 869 and 879 may extend parallel to a radial direction from the center of rotation of the rotating plate 840. Accordingly, the first type and second type blades 860 and 870 may move in a direction toward the optical axis or away from the optical axis.

In an embodiment, the first type blade 860 may include the first guide groove 869 accommodating the protruding portion 834. The first type blade 860 may move parallel to a direction in which the first guide groove 869 extends due to an interaction between the first guide groove 869 and the protruding portion 834. In an embodiment, the first guide groove 869 may extend in a direction toward the optical axis. In an embodiment, the first guide groove 869 may extend in a radial direction from the optical axis. For example, an imaginary extension line of the first guide groove 869 may cross the optical axis.

In an embodiment, the second type blade 870 may include a second guide groove 879 accommodating the protruding portion 834. The second type blade 870 may move parallel to a direction in which the second guide groove 879 extends due to an interaction between the second guide groove 879 and the protruding portion 834. In an embodiment, the second guide groove 879 may extend in a direction toward the optical axis. In an embodiment, the second guide groove 879 may extend in a radial direction from the optical axis. For example, an imaginary extension line of the second guide groove 879 may cross the optical axis.

Although not illustrated, in another embodiment, the guide grooves may be disposed in the guide plate 830 and the protruding portion may be disposed on the first type and second type blades 860 and 870. In this case, the first type and second type blades 860 and 870 may move along a direction in which the guide groove provided in the guide plate 830 extends. The guide grooves 869 and 879 provided in the guide plate 830 may extend radially around the optical axis.

In an embodiment, the first type and second type blades 860 and 870 may be disposed to at least partially overlap each other. The first type and second type blades 860 and 870 may at least partially overlap each other in the optical axis direction. For example, when the aperture module 800 is viewed in the optical axis direction, the first type and second type blades 860 and 870 may be disposed to overlap each other. Since the first type and second type blades 860 and 870 are disposed so as to overlap each other, the aperture module 800 may be implemented to have a thin thickness.

In an embodiment, the aperture module 800 may include an aperture cover 820. In an embodiment, the aperture cover 820 may form a portion of the exterior of the aperture module 800. The aperture cover 820 may protect internal components of the aperture module 800.

A portion of the aperture cover 820 may be disposed on the rotating plate 840 and the first type and second type blades 860 and 870. The aperture cover 820 may restrict the rotating plate 840 and the blades 860 and 870 to move on a designated plane. For example, the aperture cover 820 may function to press the rotating plate 840 and/or the first type and second type blades 860 and 870 in the optical axis direction so that the rotating plate 840 and/or the first type and second type blades 860 and 870 may be moved in a state adjacent to the upper surface 831 of the guide plate 830. However, for smooth driving of the rotating plate 840 and/or the first type and second type blades 860 and 870, when the aperture cover 820 is attached to the base 810, a predetermined clearance may exist between the rotating plate 840 and/or the first type and second type blades 860 and 870 and the aperture cover 820.

FIG. 6 illustrates the first type blade 860, according to an embodiment. FIG. 7 illustrates the second type blade 870, according to an embodiment.

In an embodiment, the first type blade 860 may include the pin 865 that may be coupled to the link 880. In an embodiment, the first type blade 860 may include a depression portion 866 having a height lower than that of an upper surface 861 of the first type blade 860, and the first pin 846 may extend from the depression portion 866. A lower surface 882 of the link 880 may be seated on the depression portion 866. Therefore, even if the link 880 is attached to overlap the first type blade 860, the overall thickness of the aperture module 800 may be reduced. For example, when the link 880 is attached to the first type blade 860, an upper surface 881 of the link 880 and the upper surface 861 of the first type blade 860 may coincide or substantially coincide.

In an embodiment, the first type blade 860 may include the first guide groove 869 configured to accommodate at least a portion of the protruding portion 834 of the guide plate 830 on the lower surface 862.

In an embodiment, the first type blade 860 may include a portion 867 having a thin thickness. The thin portion 867 may be defined by surfaces 868*a* and 868*b* having a height lower than that of the upper surface 861 and the lower surface 862. The first type blade 860 may be have a thick portion (or a first portion) at a central region thereof and a thin portion 867 (or a second portion) at an end region thereof, based on a stepped portion S.

In an embodiment, the second type blade 870 may include the pin 875 that may be coupled to the link 880. In an embodiment, the second type blade 870 may include a depression portion 876 having a height lower than that of an upper surface 871 of the second type blade 870, and the pin 875 may extend from the depression portion 876. The lower surface 882 of the link 880 may be seated on the depression portion 876. Therefore, even if the link 880 is attached to overlap the second type blade 870, the overall thickness of the aperture module 800 may be reduced. For example, when the link 880 is attached to the second type blade 870, the upper surface 881 of the link 880 and the upper surface 871 of the second type blade 870 may coincide or substantially coincide.

In an embodiment, the second type blade 870 may include the second guide groove 879 configured to accommodate at least a portion of the protruding portion 834 of the guide plate 830 on the lower surface 872.

In an embodiment, the second type blade 870 may include an accommodating groove 877 at an end region thereof, into which a portion of the first type blade 860 may be inserted. In an embodiment, the thin portion 867 of the first type blade 860 may be accommodated in the accommodating groove 877 of the second type blade 870. The thin portion 867 of the first type blade 860 may be positioned between two surfaces 878*a* and 878*b* each defining the accommodating groove 877.

Figure 8:
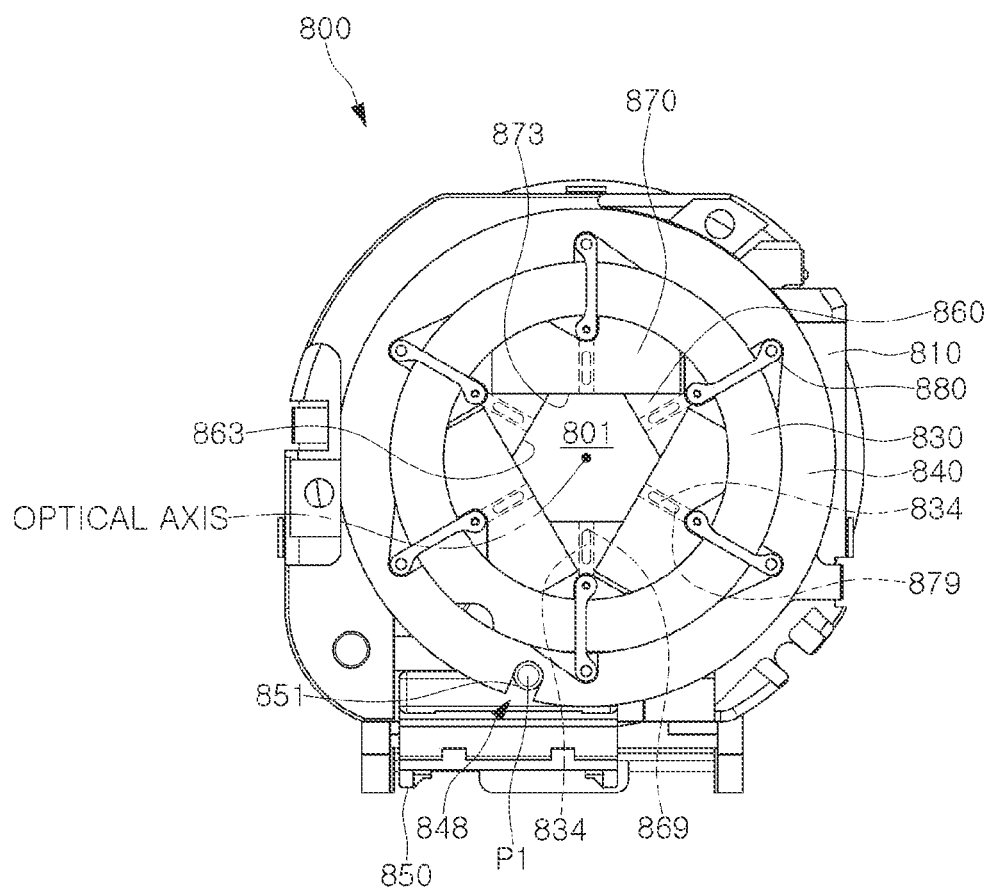
FIG. 8 is a plan view of the aperture module when an incident hole has a minimum size, in an embodiment.
Figure 9:
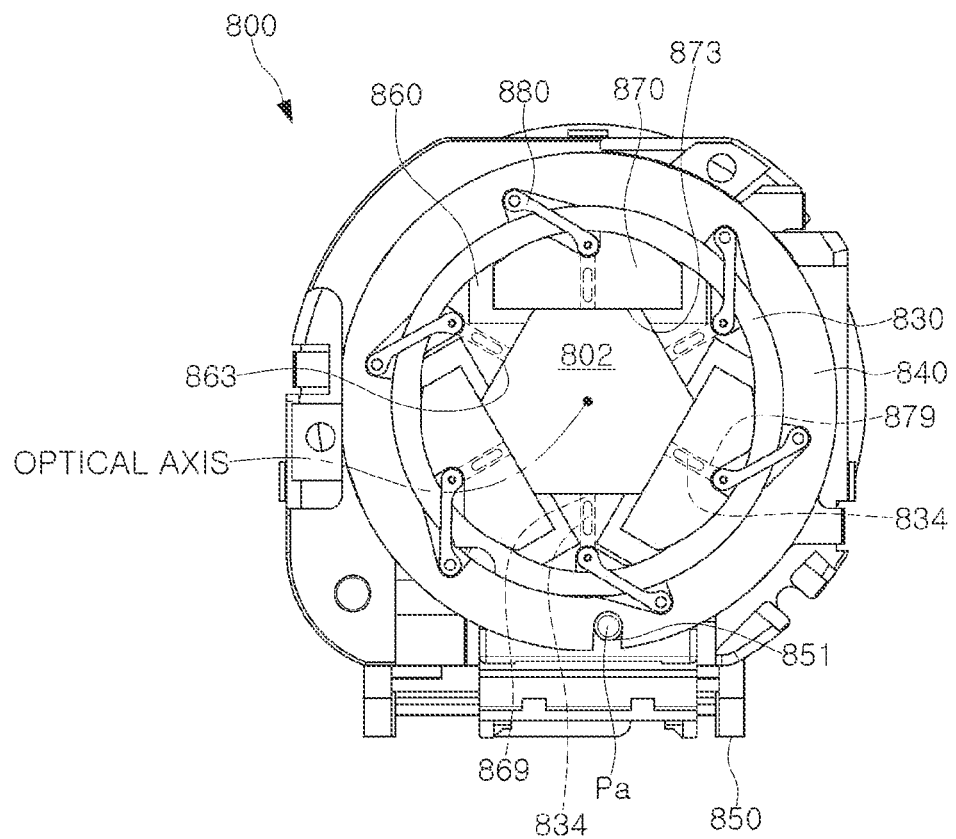
FIG. 9 is a plan view of the aperture module when the incident hole has a medium size, in an embodiment.
Figure 10:
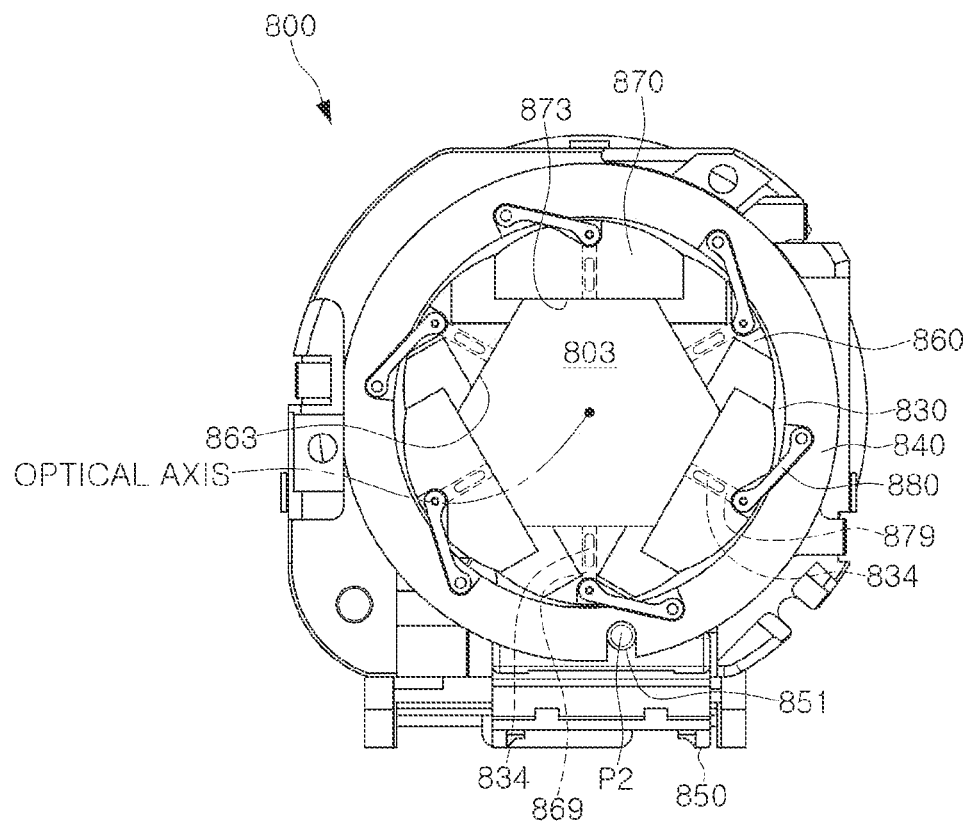
FIG. 10 is a plan view of the aperture module when the incident hole has a maximum size, in an embodiment.

In an embodiment, a portion of the first type blade 860 may be selectively accommodated in the second type blade 870 according to the driving of the aperture. Referring to FIGS. 8 through 10, as the size of the incident hole decreases, an overlapping region between the first type blade 860 and the second type blade 870 may increase. As the size of the incident hole increases, the overlapping region between the first type blade 860 and the second type blade 870 may decrease. That is, according to the size of the incident hole, a portion of the thin portion 867 of the first type blade 860 may be selectively accommodated in the accommodating groove 877 of the second type blade 870.

In an embodiment, a shape of the stepped portion S of the first type blade 860 may correspond to a shape of an edge of the second type blade 870. Referring to FIG. 8, when the size of the incident hole is the minimum size, the edge of the second type blade 870 may come into contact with (e.g., interface with) the stepped portion of the adjacent first type blade 860.

According to an embodiment, inner side surfaces 863 and 873 of the blades 860 and 870 facing the optical axis may have a plane. In an embodiment, outer side surfaces 864 and 874 of the first type and second type blades 860 and 870, respectively, facing the rotating plate 840 may have a curved surface. Referring to FIG. 10, when the size of the incident hole is the maximum size, the outer side surfaces 864 and 874 of the first type and second type blades 860 and 870, respectively, may be adjacent to an inner circumferential surface 843 of the rotating plate 840.

FIG. 8 is a plan view of the aperture module 800 when an incident hole has the minimum size, in an embodiment. FIG. 9 is a plan view of the aperture module 800 when an incident hole has a medium size, in an embodiment. FIG. 10 is a plan view of the aperture module 800 when an incident hole has the maximum size, in an embodiment.

Referring to FIGS. 8 through 10, in an embodiment, the aperture module 800 may provide the incident hole to have various sizes. The incident hole may be defined by side surfaces of the first type and second type blades 860 and 870 in the optical axis direction, and, in an embodiment, the size of the incident hole may continuously change according to the movement of the moving portion 850.

For example, as the moving portion 850 moves to the right, the protruding portion 834 may rotate the rotating plate 840 in a counterclockwise direction. As the rotating plate 840 rotates, the first type and second type blades 860 and 870 may move away from the optical axis, and the size of the incident hole may be expanded. As another example, as the moving portion 850 moves to the left, the rotating plate 840 may rotate in a clockwise direction, and the first type and second type blades 860 and 870 may move toward the optical axis. Accordingly, the size of the incident hole may be reduced.

In an embodiment, the protruding portion 851 of the moving portion 850 may be positioned between the first point P1 and the second point P2. The moving portion 850 may be positioned at an arbitrary point Pa between the first point P1 and the second point P2 by the electromagnetic force acting on the magnet 890.

When the moving portion 850 is at the first point P1, the aperture module 800 may provide an incident hole 801 having a minimum size. When the moving portion 850 is at the second point P2, the aperture module 800 may provide an incident hole 803 having a maximum size.

In an embodiment, the position of the moving portion 850 and the size of the incident hole may correspond one-to-one. As the moving portion 850 moves from the first point P1 to the second point P2, the size of the incident hole may be continuously increased. Conversely, as the moving portion 850 moves from the second point P2 to the first point P1, the size of the incident hole may be continuously decreased. For example, when the moving portion 850 is between the first point P1 and the second point P2, the aperture module 800 may provide an incident hole 802 having a medium size.

As the moving portion 850 moves from the first point P1 to the second point P2, the first type and second type blades 860 and 870 move uniformly, and therefore, the shape of the incident hole may be maintained to be constant. For example, regardless of the size of the incident hole, the shape of the incident hole may remain a regular hexagon.

In a camera module according to the embodiments disclosed herein, an amount of incident light may be selectively changed through the aperture module, deterioration of performance of the auto-focusing function may be prevented even though the aperture module is mounted in the camera module, and an increase in the weight of the camera module due to inclusion of the aperture module may be significantly reduced.

Additionally, the aperture module may be capable of continuously implementing an accurate aperture diameter while reducing the use of current.

Further, according to embodiments disclosed herein, the thickness of the aperture module may be prevented from increasing while forming the incident hole using a number of blades.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is to be defined not by the detailed description, but by the claims and their equivalents, and all variations within the scope of the claims and their equivalents are to be construed as being included in the disclosure.

What is claimed is:

1. An aperture module, comprising:
   a base;
   a rotating plate rotatably disposed on the base; and
   blades configured to form an incident hole and move linearly along a radial direction of the rotating plate by rotation of the rotating plate to change a size of the incident hole,
   wherein the blades are disposed in an opening disposed inside the rotating plate, and
   wherein the blades are spaced apart from the rotating plate in the radial direction by the rotation of the rotating plate.

2. The aperture module of claim 1, wherein the blades and the rotating plate are disposed at substantially a same position in an optical axis direction.

3. The aperture module of claim 1, wherein the blades are disposed to at least partially overlap each other in an optical axis direction.

4. The aperture module of claim 1, wherein the blades include a first type blade and a second type blade at least partially overlapping the first type blade in an optical axis direction, and
   wherein the first type blade and the second type blade are alternately arranged in a circumferential direction.

5. The aperture module of claim 4, wherein the first type blade comprises two or more first type blades, and the second type blade comprises two or more second type blades.

6. The aperture module of claim 4, wherein the first type blade includes a first portion and a second portion thinner than the first portion, and
at least a portion of the second portion is configured to be selectively accommodated in an accommodating portion formed in the second type blade.

7. The aperture module of claim 1, further comprising a link connected to at least one of the blades and the rotating plate, respectively.

8. The aperture module of claim 7, wherein the link includes a first hole and a second hole disposed at one end of the link and another end of the link, respectively,
wherein the rotating plate includes a first pin corresponding to the first hole, and
wherein the at least one of the blades includes a second pin corresponding to the second hole.

9. The aperture module of claim 8, wherein the rotating plate includes a depression portion having a height lower than a height of a periphery of the rotating plate, and
wherein the first pin is disposed in the depression portion.

10. The aperture module of claim 8, wherein the at least one of the blades includes a depression portion having a height lower than that of a periphery, and
the second pin is disposed in the depression portion.

11. The aperture module of claim 1, further comprising a plate fixedly disposed on the base and forming a seating surface at least partially in contact with the rotating plate and the blades.

12. The aperture module of claim 11, wherein the plate includes a protruding portion corresponding to at least one of the blades on the seating surface, and
wherein at the least one of the blades includes a guide groove configured to accommodate the protruding portion.

13. The aperture module of claim 12, wherein the guide groove extends in the radial direction of the rotating plate.

14. The aperture module of claim 11, wherein at least one of the blades includes protruding portion, and
wherein the plate includes a guide groove disposed on the seating surface and configured to accommodate the protruding portion.

15. An aperture module comprising:
a base;
a rotating plate rotatably disposed on the base;
blades configured to form an incident hole and move linearly along a radial direction of the rotating plate by rotation of the rotating plate to change a size of the incident hole; and
a link connected to at least one of the blades and the rotating plate, respectively,
wherein the blades are spaced apart from the rotating plate in the radial direction by the rotation of the rotating plate.

16. The aperture module of claim 15, wherein the link is rotatably coupled to the at least one of the blades and the rotating plate, respectively.

17. The aperture module of claim 15, wherein the blades include two or more first type blades and two or more second type blades at least partially overlapping the two or more first type blades, respectively, in an optical axis direction, and
wherein the first type blades and the second type blades are alternately arranged in a circumferential direction.

18. The aperture module of claim 15, wherein the blades include a first blade and a second blade at least partially overlapping the first blade in an optical axis direction, and
wherein an end portion of the second blade comprises a recess configured to receive an end portion of the first blade.

19. A camera module, comprising:
a case;
a lens module disposed in the case and including at least one lens having an optical axis; and
an aperture module disposed over the lens module in a direction of the optical axis, and comprising:
a base;
a rotating plate rotatably disposed on the base, and including a ring-shaped member surrounding an opening through which an optical axis extends; and
blades configured to form a hole through which light incident to the aperture model passes, and configured to move linearly along a radial direction of the rotating plate by rotation of the rotating plate to change a size of the hole,
wherein the blades are disposed in the opening without overlapping the ring-shaped member in the direction of the optical axis, and
wherein the blades are spaced apart from the rotating plate in the radial direction by the rotation of the rotating plate.

20. The camera module of claim 19, further comprising:
a guide plate forming a seating surface on which the blades and the rotating plate are disposed,
wherein the guide plate is configured to guide movement of the blades in the radial direction with respect to the optical axis.

21. The camera module of claim 20, further comprising rotatable links connecting the rotating plate to the blades, respectively.

22. The camera module of claim 19, wherein the blades include a first blade and a second blade at least partially overlapping the first blade in the direction of the optical axis, and
wherein an end portion of the second blade comprises a recess configured to receive an end portion of the first blade.

23. The camera module of claim 22, wherein a surface of the first blade comprises a stepped portion configured to interface with the end portion of the second blade.

24. A portable electronic device comprising the camera module of claim 19.

* * * * *